United States Patent
Tu et al.

(10) Patent No.: US 8,254,479 B2
(45) Date of Patent: Aug. 28, 2012

(54) METHOD OF DETECTING TRANSMISSION CHANNEL AND RELATED WIRELESS COMMUNICATION SYSTEM

(75) Inventors: Yung-Szu Tu, Taipei County (TW); Jiunn-Tsair Chen, Hsinchu County (TW); Yen-Chin Liao, Taipei (TW); Cheng-Hsuan Wu, Taipei (TW)

(73) Assignee: Ralink Technology, Corp., Jhubei, Hsinchu County (TW)

( * ) Notice: Subject to any disclaimer, the term of this patent is extended or adjusted under 35 U.S.C. 154(b) by 498 days.

(21) Appl. No.: 12/501,486

(22) Filed: Jul. 12, 2009

(65) Prior Publication Data

US 2010/0272198 A1    Oct. 28, 2010

(30) Foreign Application Priority Data

Apr. 22, 2009  (TW) ................................ 98113311 A

(51) Int. Cl.
*H04L 17/28* (2006.01)
*H04L 27/00* (2006.01)

(52) U.S. Cl. ...................................... 375/260; 375/316

(58) Field of Classification Search .................. 375/260, 375/316, 340–342
See application file for complete search history.

(56) References Cited

U.S. PATENT DOCUMENTS

| | | | | |
|---|---|---|---|---|
| 5,687,198 | A * | 11/1997 | Sexton et al. | 375/347 |
| 6,370,189 | B1 * | 4/2002 | Morrison et al. | 375/224 |
| 6,888,903 | B1 * | 5/2005 | Stenstrom et al. | 375/350 |
| 6,934,340 | B1 * | 8/2005 | Dollard | 375/260 |
| 2002/0196866 | A1 * | 12/2002 | Diehl et al. | 375/316 |
| 2006/0239367 | A1 * | 10/2006 | Wilhelmsson et al. | 375/260 |
| 2008/0310532 | A1 * | 12/2008 | Baggen et al. | 375/260 |

FOREIGN PATENT DOCUMENTS

CN        101346955 A        1/2009

* cited by examiner

*Primary Examiner* — Khanh C Tran
(74) *Attorney, Agent, or Firm* — Winston Hsu; Scott Margo

(57) ABSTRACT

A method and related system of transmission channel detection condition in a wireless communication system are disclosed. The method includes receiving a symbol, performing a channel estimation operation to generate a channel estimation result according to the symbol, performing a cross correlation operation on the channel estimation result and an initial channel estimation result to generate an operation result, and determining whether the condition of the transmission channel have changed or not.

13 Claims, 3 Drawing Sheets

METHOD OF DETECTING TRANSMISSION CHANNEL AND RELATED WIRELESS COMMUNICATION SYSTEM

BACKGROUND OF THE INVENTION

1. Field of the Invention

The present invention relates to a method and related system of detecting a transmission channel in a wireless communication system, and more particularly, to a method and related system of detecting a transmission channel by recording a result of a cross correlation operation.

2. Description of the Prior Art

In a wireless communication system, wireless signals are assumed to be transmitted over a steady transmission channel. As a matter of fact, the transmission channel may change abruptly since the distance between two communication devices is changed or there is an obstacle between the communication devices. However, abrupt change of the transmission channel could result in false outcomes of some algorithms. For example, a rate adaptation algorithm is used for measurements of packet error rate within a fixed period of time. Once the abrupt change of the transmission channel occurs, the packet error rate obtained from the rate adaptation algorithm cannot reflect the current channel condition accurately, causing the rate adaptation algorithm no more reliable. Thus, it is important in the wireless communication system to detect the abrupt change of the transmission channel.

In the prior art, the abrupt change of the transmission channel is detected by using the energy of received signals. The spectrum of the received signal is filtered into several sub-bands. A time interval of interest corresponding to each sub-band is divided into two sections. For each band, a time position of dividing the time interval is determined to be a division position resulting in maximum difference of average energy between the sections. If the time positions of division corresponding to each sub-band are located at the same position or in the neighboring hood, the abrupt change of the transmission channel is declared.

However, the abrupt change of the transmission channel may not involve in energy change of the received signals. In this situation, the prior art can not accurately detect the change of the transmission channel. Further, in practice, it has high complexity to determine the time positions of division for each sub-band by finding maximum differences of average energy between two sections of the time interval. Consequently, the cost will rise accordingly.

To sum up, when the change of the transmission channel does not involve in energy changes of received signals, the prior art can not accurately detect whether there is any abrupt change over the transmission channel. In addition, the cost increases due to high complexity in practice.

SUMMARY OF THE INVENTION

It is thereof an objective of the present invention to provide a method and related wireless communication system of detecting a transmission channel in a wireless communication system.

The present invention discloses a method of detecting a transmission channel in a wireless communication system. The method includes receiving a symbol, performing a channel estimation operation to generate a channel estimation result according to the symbol, performing a cross correlation operation between the channel estimation result and an initial channel estimation result to generate a calculation result and determining whether the transmission channel has changed according to the calculation result.

The present invention further discloses a wireless communication system. The wireless communication system includes a reception unit, a calculation unit and a finite state machine. The reception unit is used for receiving a symbol. The calculation unit is used for performing a channel estimation operation to generate a channel estimation result and performing a cross correlation operation between the channel estimation result and an initial channel estimation result to generate a calculation result. The finite state machine is used for switching states according to the calculation result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
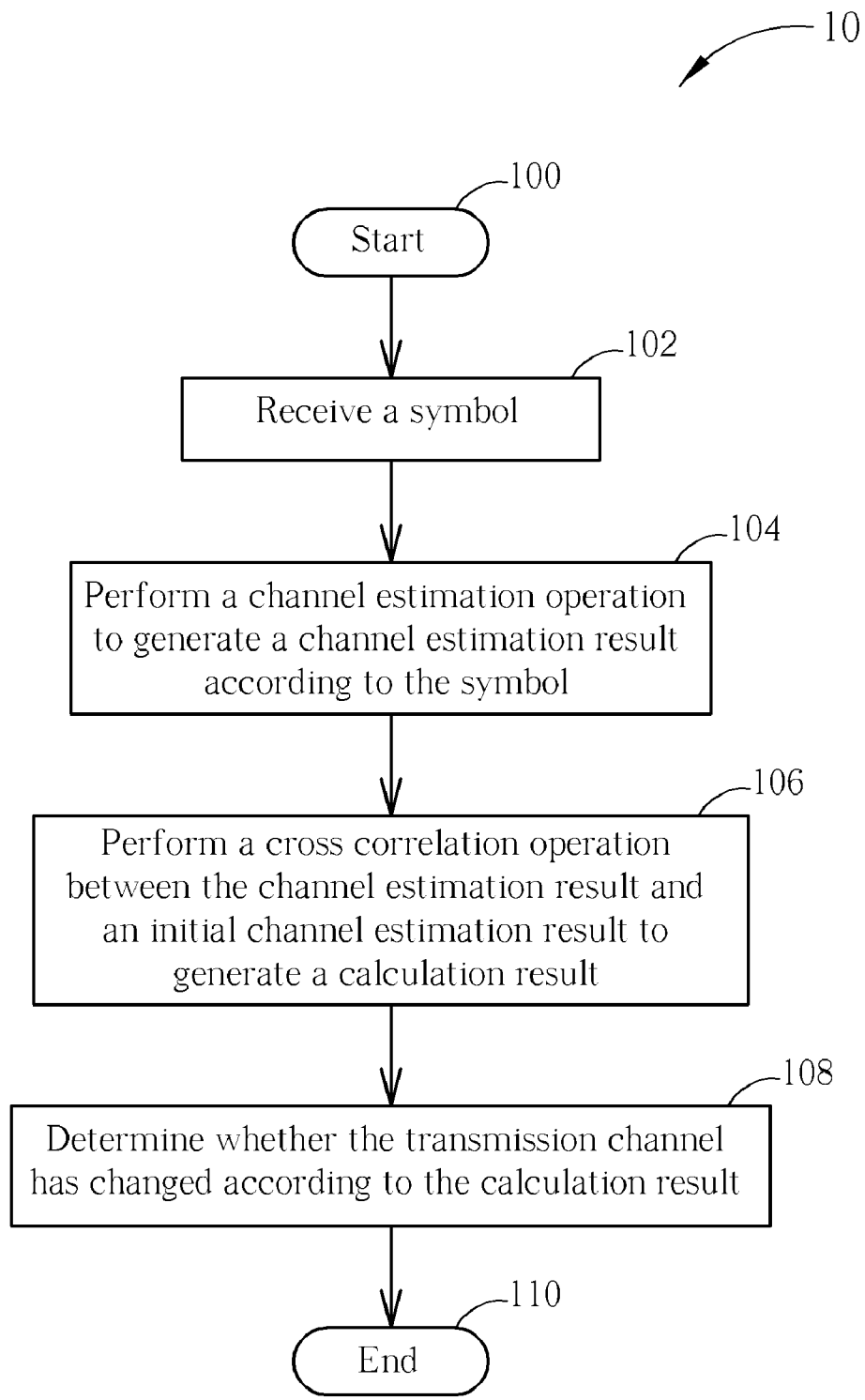
FIG. 1 is a flow chart of a process according to an embodiment of the present invention.

Please refer to FIG. 1, which is a flow chart of a process 10 according to an embodiment of the present invention. The process 10 is used for detecting a transmission channel in a wireless communication system. The process 10 includes the following steps:

Step 100: Start.

Step 102: Receive a symbol.

Step 104: Perform a channel estimation operation to generate a channel estimation result according to the symbol.

Step 106: Perform a cross correlation operation between the channel estimation result and an initial channel estimation result to generate a calculation result.

Step 108: Determine whether the transmission channel has changed according to the calculation result.

Step 110: End.

According to the process 10, the embodiment of the present invention performs the channel estimation operation to generate the channel estimation result after receiving the symbol. Then, the embodiment of the present invention performs the cross correlation operation between the channel estimation result and the initial channel estimation result to generate the calculation result, and determines whether the transmission channel has changed according to the calculation result.

In other words, when the wireless communication system receives the symbol, the embodiment of the present invention obtains a new channel estimation result through the channel estimation operation and generates the calculation result through the cross correlation operation between the new channel estimation result and the initial channel estimation result, in order to determine the similarity between the new channel estimation result and the initial channel estimation result. Finally, the embodiment of the present invention determines whether the transmission channel has changed according to the calculation result. Consequently, even though the change of the transmission channel does not involve in energy change, the embodiment of the present invention still can detect the change of the transmission channel.

Thus, the embodiment of the present invention determines the similarity of two channel estimation results based on the calculation result of the cross correlation operation and further detects whether there is any change over transmission channel. Therefore, the present invention solves the cost increase due to high complexity and the problem caused by the prior art not being capable of detecting the change of the transmission channel when energy change does not get involved.

Figure 2A:
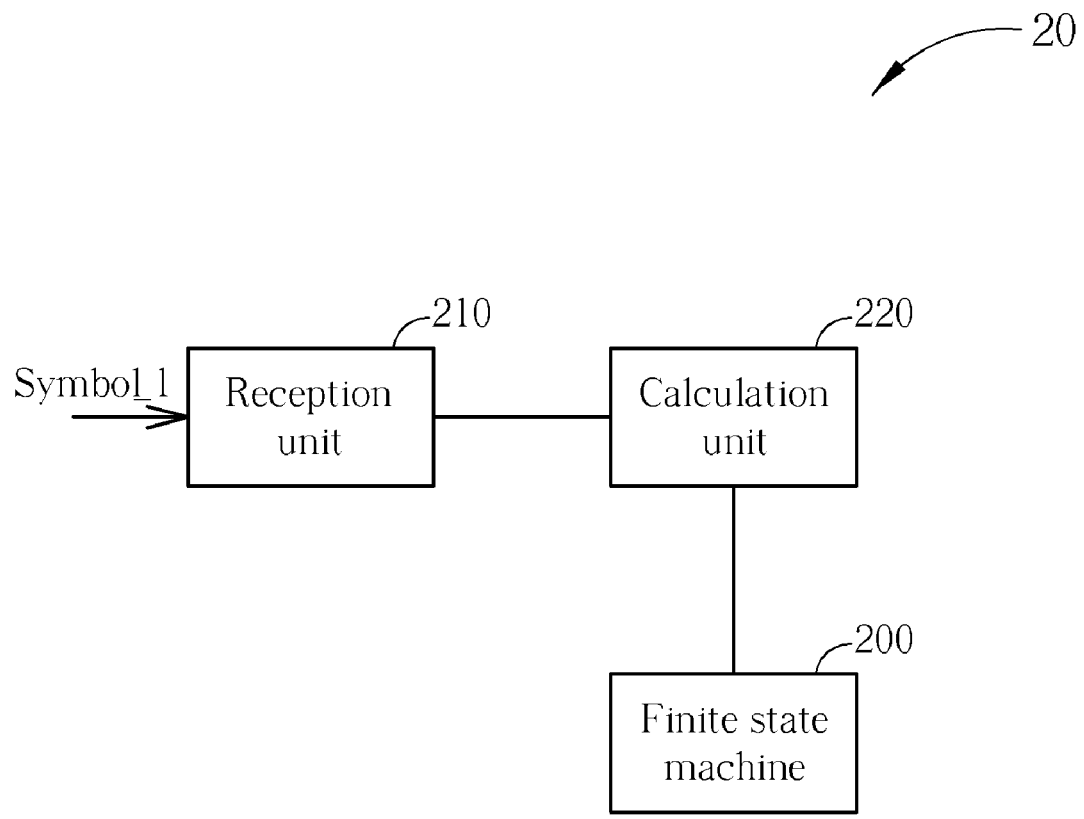
FIG. 2A is a schematic diagram of a wireless communication system according to an embodiment of the present invention.
Figure 2B:
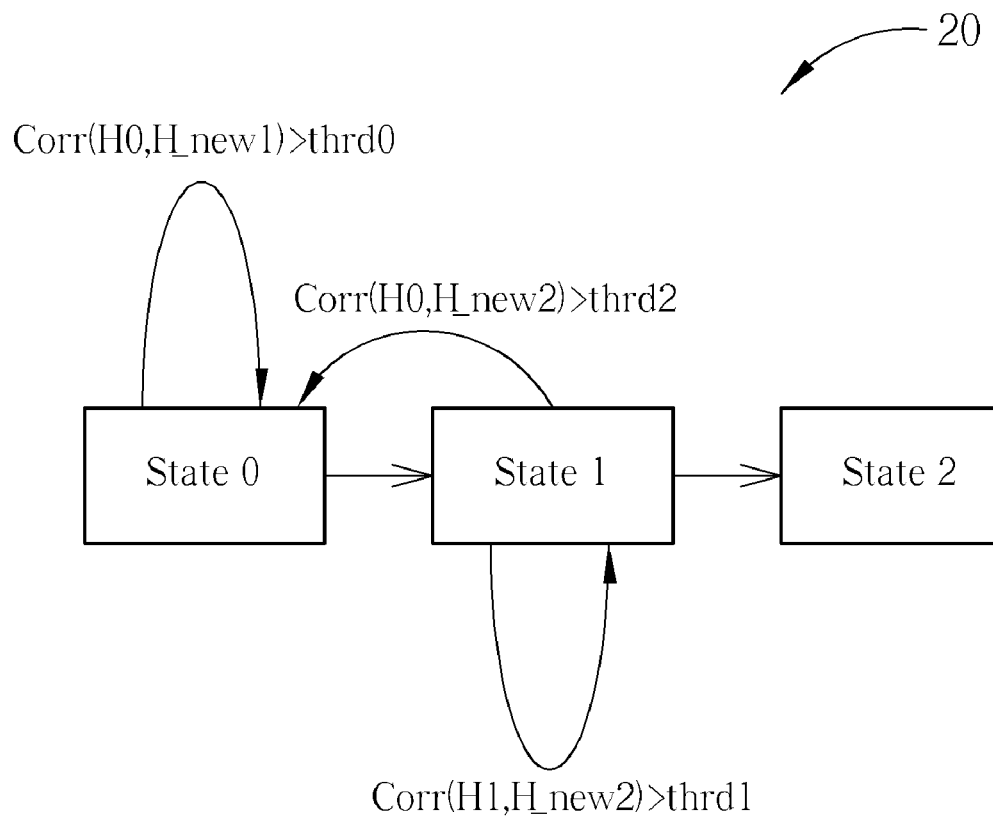
FIG. 2B is the finite state machine shown in FIG. 2A.

The implementation of the process 10 can be known by referring to FIG. 2A and FIG. 2B. FIG. 2A is a schematic diagram of a wireless communication system 20 according to an embodiment of the present invention. The wireless communication system 20 could be an access point (AP) device and includes a finite state machine 200, a reception unit 210, and a calculation unit 220. The finite state machine 200 is used for switching states according to a calculation result. The reception unit 210 is used for receiving a symbol symbol_1. The calculation unit 220 is used for performing a channel estimation operation to generate a channel estimation result and performing a cross correlation operation between the channel estimation result and an initial channel estimation result to generate a calculation result. Preferably, the implementation of the finite state machine 200 can be known by referring to FIG. 2B. FIG. 2B is the finite state machine 200 shown in FIG. 2A. The finite state machine 200 is employed for a wireless communication system, such as wireless communication system complying with IEEE 802.11 standard. The finite state machine 200 can record a change of the cross correlation operation result and includes a state 0, a state 1, and a state 2. The state 0 is a steady state and the state 1 and state 2 are transient states. When the current state of the finite state machine 200 is state 0, the transmission channel of the wireless communication system obtains an initial channel estimation result H0 through the channel estimation operation. As known by those skilled in the art, the channel estimation operation is used for estimating the impulse response of the transmission channel weighted by white noise and interferences.

Therefore, take the wireless communication system complying with IEEE 802.11 standard for example. When the reception unit 210 receives an orthogonal frequency division multiplexing (OFDM) symbol symbol_1, the calculation unit 220 obtains a new channel estimation result H_new1 by performing the channel estimation operation. Subsequently, the calculation unit 220 performs a cross correlation operation to obtain the similarity between the initial channel estimation result H0 and the channel estimation result H_new1. If the initial channel estimation result H0 and the channel estimation result H_new1 have high similarity, the finite state machine 200 stays in the current state. If the initial channel estimation result H0 and the channel estimation result H_new1 have low similarity, the finite state machine 200 switches to the next state. Namely, the calculation unit 220 performs the cross correlation operation according the initial channel estimation result H0 and the channel estimation result H_new 1 to generate a calculation result Corr (H0, H_new1). When the finite state machine 200 stays at the stat 0, the calculation result Corr (H0, H_new1) is compared with a threshold value thrd0 to generate a comparison result X. When the comparison result X indicates the calculation result Corr (H0, H_new1) is greater than the threshold value thrd0, the finite state machine 200 continues staying at the state 0. When the comparison result X indicates the calculation result Corr (H0, H_new1) is less than the threshold value thrd0 or equal to the threshold value thrd0, the finite state machine 200 switches to the state 1.

The threshold value thrd0 can be obtained by experimental statistic calculation. Thus, based on a steady channel estimation result under well-controlling environment and the channel estimation result over changed transmission channel, their similarity is compared to determine the threshold value thrd0. In addiction, when the finite state machine 200 holds its state at the state 0, the value of the initial channel estimation result H0 is replaced by the channel estimation result H_new1. When the finite state machine 200 switches to the state 1, the channel estimation result H_new1 is identical to the channel estimation result H1 of the state 1.

Further, when the finite state machine 200 stays at the state 1, the calculation unit 220 performs the channel estimation operation again to obtain a channel estimation result H_new2 if a symbol symbol_2 is received. Subsequently, the channel estimation result H_new2 performs the cross correlation operation with the initial channel estimation result H0 and the channel estimation result H1, respectively, in order to obtain the similarity between the channel estimation result H_new2 and the initial channel estimation result H0, and the similarity between the channel estimation result H_new2 and the channel estimation result H1. When a calculation result Corr (H0, H_new2) is greater than a threshold value thrd2, the finite state machine 200 switches to the state 0. When the calculation result Corr (H1, H_new2) is greater than a threshold value thrd1, the finite state machine 200 continues staying at the state 1. If the calculation results are not satisfied with the conditions above (i.e. Corr (H0, H_new2)≦thrd2 or Corr (H1, H_new2)≦thrd1), it represents the channel estimation result H_new2 has low similarity with the initial channel estimation result H0 and the channel estimation result H1. Therefore, the finite state machine 200 switches to the state 2.

Similarly, the threshold value thrd1 and the threshold value thrd2 can be obtained by experimental statistic calculation as well, and is thus not elaborated on herein. When the finite state machine 200 retains its state at the state 1, the value of the channel estimation result H1 is replaced by the channel estimation result H_new2. When the finite state machine 200 switches to the state 0, the value of the initial channel estimation result H0 is replaced by the channel estimation result H_new2. When the finite state machine 200 switches to the state 2, the channel estimation result H_new2 is identical to a channel estimation result H2 of the state 2. When the finite states machines 200 stays at the state 2, the abovementioned operations repeat, and thus are not narrated herein. Please note that the number of the states of the finite state machine 200 is not limited to three states mentioned above. For simplicity, only three states are shown in FIG. 2.

On the other hand, once the finite state machine 200 leaves the state 0, a timer starts simultaneously. The embodiment of the present invention determines whether the transmission channel has changed according to the state of the finite state machine 200 when the timer expires. If the timer expires, and the finite state machine 200 stays at the state other than the state 0, the embodiment of the present invention determines the transmission channel has changed. If the finite state machine 200 returns to the state 0 before the timer expires, the timer will reset. And the timer restarts when the finite state machine 200 leaves the state 0.

Thus, every time a symbol received, the embodiment of the present invention determines the similarity between two channel estimation results, based on cross correlation operation results. Upon the expiry of the timer, the embodiment of the present invention determines whether the finite state machine stays at the initial state by comparing similarity between the initial channel estimation result and the channel estimation result of the current state. If the finite state machine stays at the state other than the initial state, the embodiment of the present invention determines the transmission channel has changed. Comparing with the prior art, the present invention can detect the transmission channel has changed even though the change of the transmission channel does not involved in energy change.

Please note that the aforementioned method of detecting transmission channel is just one embodiment of the present invention. The present invention does not limit implementation of detecting the transmission channel to the finite state machine. Any device capable of realizing aforementioned method can be included in the field of the present invention. Those skilled in the art can modify it according the practical requirement. Thus, it is not limited herein.

To sum up, the embodiment of the present invention determines the similarity between two channel estimation results according to the cross correlation operation result when receiving a symbol. Further, the embodiment of the present invention detects whether the transmission channel has changed to solve the cost increase due to high complexity and the problem caused by that the prior art not being capable of detecting the change of the transmission channel when energy change does not get involved.

Those skilled in the art will readily observe that numerous modifications and alterations of the device and method may be made while retaining the teachings of the invention.

What is claimed is:

1. A method of detecting a transmission channel in a wireless communication system, the method comprising:
   receiving a symbol;
   performing a channel estimation operation to generate a channel estimation result according to the symbol;
   performing a cross correlation operation between the channel estimation result and an initial channel estimation result to generate a calculation result;
   comparing the calculation result with a threshold value to generate a comparison result, wherein the threshold value results form a statistic calculation of the transmission channel in the wireless communication system; and
   determining whether the transmission channel has changed according to the comparison result.

2. The method of claim 1, wherein the step of determining whether the transmission channel has changed according to the comparison result comprises:
   setting a timer;
   starting the timer when the comparison result indicates that the calculation result is less than the threshold value or equal to the threshold value; and
   determining that the transmission channel has changed when the timer expires.

3. The method of claim 2 further comprising:
   stopping the timer when the comparison result is greater than the threshold value.

4. The method of claim 1, wherein the wireless communication system is a wireless communication system complying with IEEE 802.11 standard.

5. The method of claim 1, wherein the symbol is an orthogonal frequency division multiplexing (OFDM) symbol.

6. A wireless communication system comprising:
   a reception unit for receiving a symbol;
   a calculation unit for performing a channel estimation operation to generate a channel estimation result and performing a cross correlation operation between the channel estimation result and an initial channel estimation result to generate a calculation result; and
   a finite state machine for switching states according to the calculation result, wherein the finite state machine does not switch a current state when the calculation result is greater than a threshold value.

7. The wireless communication system of claim 6, wherein the wireless communication system is a wireless communication system complying with IEEE 802.11 standard.

8. The wireless communication system of claim 6, wherein the symbol is an orthogonal frequency division multiplexing (OFDM) symbol.

9. The wireless communication system of claim 6, wherein the threshold value results from a statistic calculation of the transmission channel in the wireless communication system.

10. A wireless communication system comprising:
    a reception unit for receiving a symbol;
    a calculation unit for performing a channel estimation operation to generate a channel estimation result and performing a cross correlation operation between the channel estimation result and an initial channel estimation result to generate a calculation result; and
    a finite state machine for switching states according to the calculation result, wherein the finite state machine switches the current state to a second state when the calculation result is less than the threshold value or equal to the threshold value.

11. The wireless communication system of claim 10 further comprising:
    a timer, which starts when the comparison result indicates that the calculation result is less than the threshold value or equal to the threshold value.

12. The wireless communication system of claim 10, wherein the wireless communication system is a wireless communication system complying with IEEE 802.11 standard.

13. The wireless communication system of claim 10, wherein the symbol is an orthogonal frequency division multiplexing (OFDM) symbol.

* * * * *